(12) United States Patent
Faber

(10) Patent No.: US 10,621,158 B2
(45) Date of Patent: Apr. 14, 2020

(54) TRANSACTION LOG TRACKING

(71) Applicant: SEAGATE TECHNOLOGY LLC, Cupertino, CA (US)

(72) Inventor: Colin Faber, Arvada, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 231 days.

(21) Appl. No.: 15/671,009

(22) Filed: Aug. 7, 2017

(65) Prior Publication Data
US 2019/0042616 A1   Feb. 7, 2019

(51) Int. Cl.
G06F 17/30   (2006.01)
G06F 16/23   (2019.01)
G06F 16/17   (2019.01)

(52) U.S. Cl.
CPC ...... *G06F 16/2358* (2019.01); *G06F 16/1734* (2019.01)

(58) Field of Classification Search
None
See application file for complete search history.

(56) References Cited

U.S. PATENT DOCUMENTS

| | | | | |
|---|---|---|---|---|
| 5,852,443 A * | 12/1998 | Kenworthy | ........... | G06T 11/001 345/441 |
| 6,697,063 B1 * | 2/2004 | Zhu | ........ | G06T 15/005 345/421 |
| 6,747,658 B2 * | 6/2004 | Doyle | ....... | G06T 1/60 345/531 |
| 8,223,157 B1 * | 7/2012 | Baldwin | ........ | G09G 5/393 345/501 |
| 9,576,013 B2 * | 2/2017 | Legler | ........ | G06F 16/2379 |
| 2002/0107837 A1 * | 8/2002 | Osborne | ........ | G06F 11/1471 |
| 2003/0217040 A1 * | 11/2003 | Osborne | ........ | G06F 11/1471 |
| 2009/0094294 A1 * | 4/2009 | Morris | ........ | G06F 11/079 |
| 2012/0005542 A1 | 1/2012 | Petersen et al. | | |
| 2012/0221683 A1 | 8/2012 | Ferris | | |
| 2015/0261776 A1 | 9/2015 | Attarde et al. | | |
| 2015/0286668 A1 * | 10/2015 | Legler | ........ | G06F 16/2379 707/736 |
| 2016/0034538 A1 * | 2/2016 | Oberle | ........ | H04L 67/02 707/722 |

* cited by examiner

*Primary Examiner* — Hung D Le
(74) *Attorney, Agent, or Firm* — Holzer Patel Drennan

(57) ABSTRACT

Systems and methods for improving transaction log tracking are described. In one embodiment, the systems and methods may include selecting a portion of records in a transaction log, assembling records in the portion of records into groups of related records, analyzing one or more actions associated with particular records of the groups of related records, and removing one or more records from the portion of records based at least in part on the analysis. In some cases, at least one of the records of the transaction log record an action performed in relation to one or more data objects associated with the storage system.

20 Claims, 9 Drawing Sheets

TRANSACTION LOG TRACKING

SUMMARY

The present disclosure is directed to methods and systems for improving transaction log tracking. In some embodiments, the present systems and methods may improve transaction log tracking by removing one or more records of a transaction log and/or consolidating one or more records of the transaction log.

A storage system for improving transaction log tracking is described. In one embodiment, the storage system device may include a storage drive and a processor. In some embodiments the processor may be configured to select a portion of records in a transaction log, assemble records in the portion of records into groups of related records, analyze one or more actions associated with particular records of the groups of related records, and remove one or more records from the portion of records based at least in part on the analysis. In some cases, at least one of the records of the transaction log may record an action performed in relation to one or more data objects associated with the storage system. In some cases, the one or more data objects include at least one file stored in a database of the storage system or at least one directory of a file system of the storage system, or any combination thereof.

In some embodiments the processor may be configured to build an in-memory database of the portion of records selected and assembled from the records of the transaction log. In some cases, a size of the in-memory database may be determined by at least one of a predetermined record depth and a predetermined queue flush time.

In some embodiments the processor may be configured to identify each record associated with a first data object associated with the storage system and/or identify each record associated with a second data object associated with the storage system. In some embodiments the processor may be configured to group each record from the portion of records that is associated with a first data object into a first group of related records and/or group each record from the portion of records that is associated with a second data object into a second group of related records.

In some cases, the records in the first group of related records may be arranged in an order in which actions of the records in the first group of related records are performed. In some cases, the records in the second group of related records may be arranged in an order in which actions of the records in the second group of related records are performed.

In some embodiments the processor may be configured to determine, based at least in part on the analysis, at least one action from the records associated with the first data object indicates the first data object is no longer being acted upon by the storage system. In some embodiments the processor may be configured to remove the first group of related records from the transaction log upon determining the at least one action indicates the first data object is no longer being acted upon by the storage system.

In some embodiments the processor may be configured to determine, based at least in part on the analysis, at least one action from the records associated with the second data object indicates the second data object remains in use by the storage system. In some embodiments the processor may be configured to consolidate two or more records in the second group of related records into a single consolidated record upon determining the at least one action indicates the second data object remains in use by the storage system.

A method for improving transaction log tracking is also described. In one embodiment, the method may include selecting a portion of records in a transaction log, assembling records in the portion of records into groups of related records, analyzing one or more actions associated with particular records of the groups of related records, and removing one or more records from the portion of records based at least in part on the analysis. In some cases, at least one of the records of the transaction log record an action performed in relation to one or more data objects associated with the storage system.

A computer-program product to improve a cloud storage system for improving transaction log tracking is also described. In one embodiment, the computer-program product may include a non-transitory computer-readable medium storing instructions thereon, the instructions being executable by one or more processor to perform the steps of selecting a portion of records in a transaction log, assembling records in the portion of records into groups of related records, analyzing one or more actions associated with particular records of the groups of related records, and removing one or more records from the portion of records based at least in part on the analysis. In some cases, at least one of the records of the transaction log record an action performed in relation to one or more data objects associated with the storage system The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

Figure 1:
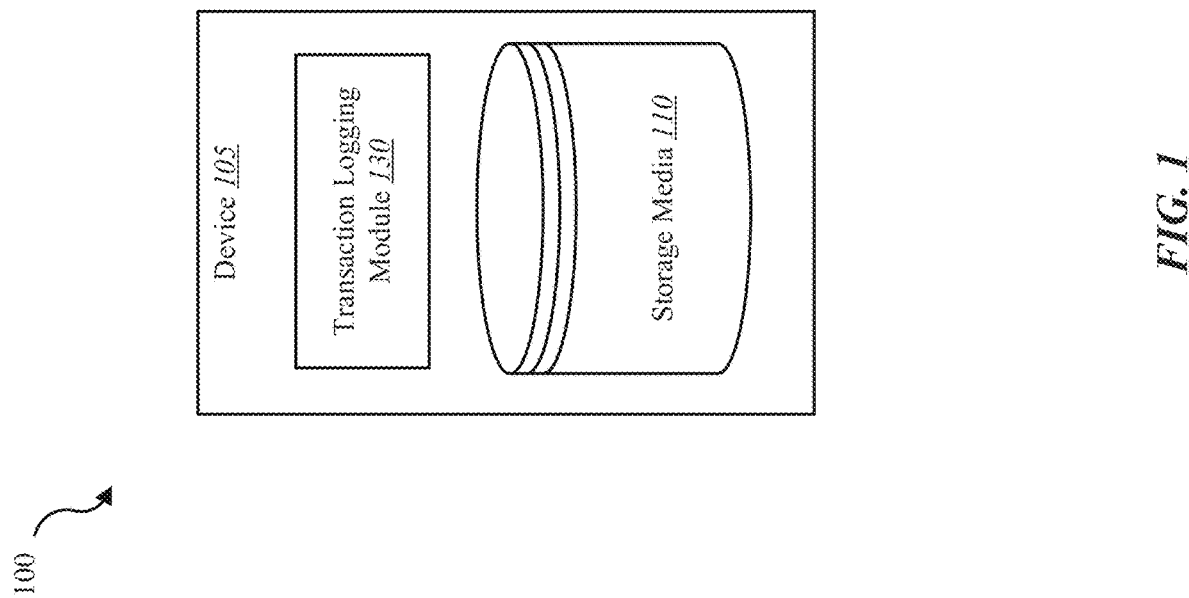
FIG. 1 is a block diagram of an example of a system in accordance with various embodiments.

The following relates generally to improving transaction log tracking. Specifically, the present systems and methods relate to an algorithmically-based method that improves transaction log tracking by removing unnecessary records, resulting in reduced file processing within the log, improved database operations, and improved file system performance.

In some embodiments, numerous records are generated by a file system's transaction logger. While a policy may specify that some records be logged and processed, others records may be needlessly logged and processed. Storing and processing the non-essential records bloats the size of the transaction log and negatively affects file system performance. On a conventional file system, unnecessary records have not been removed prior to transaction log processing. The present systems and methods remove all unnecessary records from the transaction log, resulting in a right-sized log and significant performance gains in record processing.

In one example, the present systems and methods introduce intelligence into the workflow of record set processing. In some embodiments, the present systems and methods first restructure the record sets into a more orderly form. Then the algorithm of the present systems and methods examines the entire record set in memory and determines which records to exclude from further processing.

Removing records associated with temporary files from the transaction log reduces the overall number of records processed and related database and file system operations, which translates to significant performance improvement on the system's base hardware. Additionally, the present systems and methods reduce the overall file system and database load by the same factor.

In some embodiments, the present systems and methods remove records related to temporary files. In some embodiments, the present systems and methods may remove records by targeting various types of operations which generate multiple records for a given file and consolidate these operations into a single database and file system set.

In some embodiments, the present systems and methods may reduce the overall database load by performing only one commit operation on a group of records, thereby aggregating changes into the most critical updates. In one example, a record set contains one create record, several records of change operations, a rename record and operations. With the present systems and methods, the operations can be collapsed into a single transaction set, to reduce the overall system load for future processing requirements. In some cases, the present systems and methods may collapse record sets to the most essential entries required to keep the relational database in sync with the file system and still allow for normal operating conditions, such as policy execution, etc.

In an example policy engine, the primary transaction log consumer may read and/or analyze the transaction log provided. This log review may result in data normalization of the logging events stream into a relational database. In some situations, there may be a one-to-many relationship between the log records and various database actions. For example, a single database operation may result in several records in the transaction log. Additionally, there may be a one-to-many relationship between log records and file system calls, such as file identifier (FID), parent FID resolution, stat( ), getstripe, and an extended attribute collection. For example, a single file system operation may result in several records in the transaction log. Because of the one-to-many relationship, each record, regardless of its value or relevance, may result in expensive file system and database activity.

In some embodiments, the present systems and methods may build an in-memory database of the transaction log records. In some cases, the in-memory record set may be determined by a record depth in a memory queue and a timing between queue flushes. As one example, the queue depth may be set to a maximum of 65,535 records depending on available memory. Similarly, a queue flush time may be set to 3 seconds as one example. In some cases, the queue flush time may be adjusted based at least in part on overall observed load. The more records the present systems and methods is able to examine at one time, the more likely the present systems and methods is able to reduce the total record count that would otherwise result in additional processing downstream.

FIG. 1 is a block diagram illustrating one embodiment of an environment 100 in which the present systems and methods may be implemented. The environment may include device 105 and storage media 110. The storage media 110 may include any combination of hard disk drives, solid state drives, and hybrid drives that include both hard disk and solid state drives. In some embodiment, the storage media 110 may include shingled magnetic recording (SMR) storage drives. In some embodiments, the systems and methods described herein may be performed on a single device such as device 105. In some cases, the methods described herein may be performed on multiple storage devices or a network of storage devices such a cloud storage system and/or a distributed storage system. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include transaction logging module 130. In one example, the device 105 may be coupled to storage media 110. In some embodiments, device 105 and storage media 110 may be components of flash memory or a solid state drive and/or another type of storage drive. Alternatively, device 105 may be a component of a host of the storage media 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage media 110 may include a database. Additionally, or alternatively, the database may include a connection to a wired and/or a wireless database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage media 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage media 110 may be internal to device 105. As one example, device 105 may include a storage controller that interfaces with storage media of storage media 110. Transaction logging module 130 may detect and/or track events associated with a storage system such as a cloud storage system. For example, transaction logging module 130 may monitor database operations and/or file system operations of the cloud storage system. In some cases, transaction logging module 130 may generate a transaction log and record each database operations and/or file system operation in the transaction log. In some cases, transaction logging module 130 may analyze the records of the transaction log and determine that one or more records in the transaction log may be removed and/or consolidated.

Figure 2:
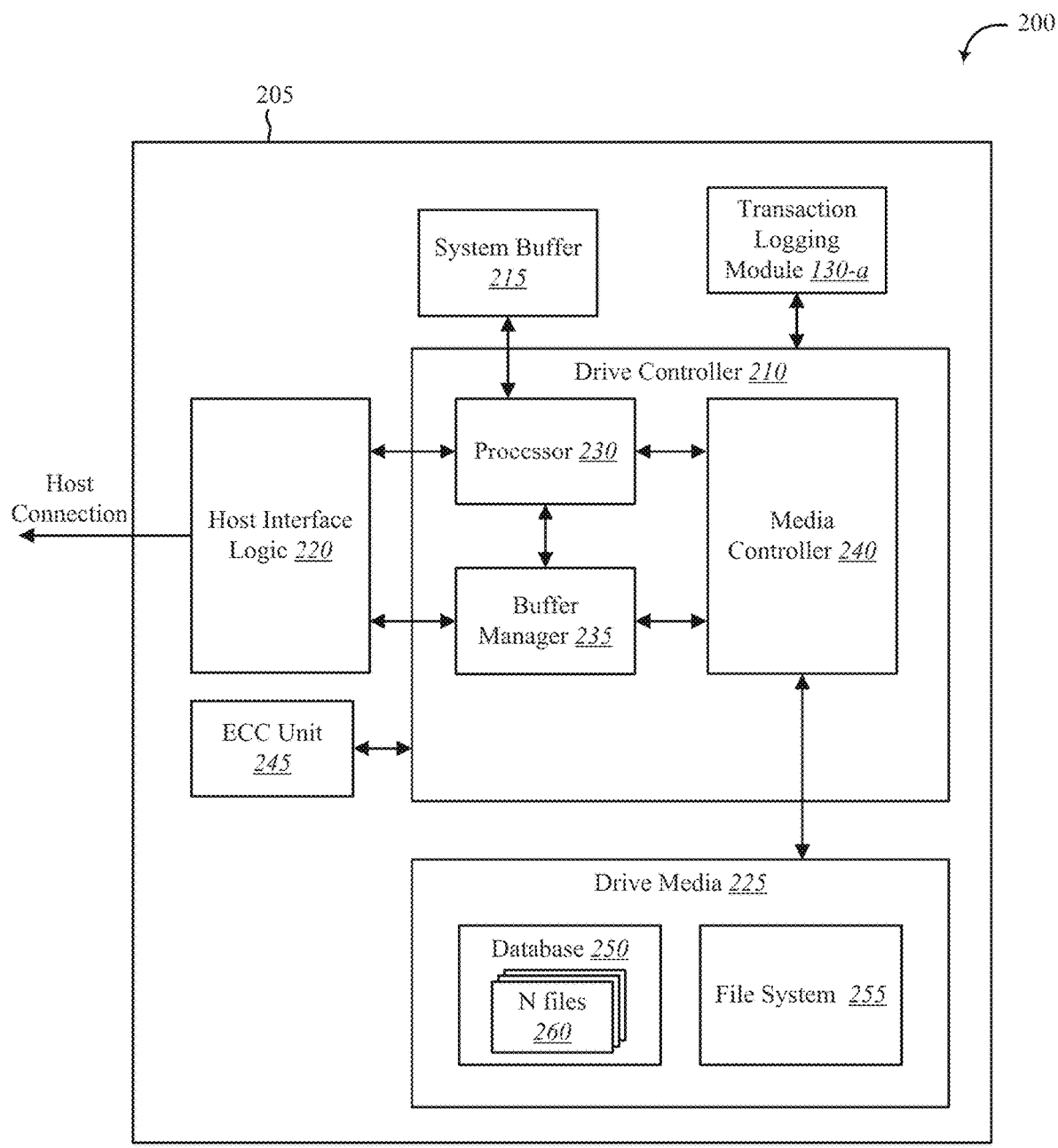
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and transaction logging module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The driver controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, ECC unit 245 may perform error correction on data stored in drive media 225.

As depicted, drive media 225 may include database 250 and file system 255. In some embodiments, database 250 may store one or more files 260. In some cases, the one or more files 260 may be organized according the file system 255. In some cases, file system 255 may include one or more file directories in which the one or more files 260 are stored. In some cases, drive media 225 may store a transaction log of operations performed in relation to at least one of database 250, file system 255, or the one or more files 260, or any combination thereof. Additionally or alternatively, the transaction log may be stored in main memory or system memory associated with apparatus 205.

In some embodiments, transaction logging module 130-a may include at least one of one or more processors, one or more memory devices, one or more storage devices, instructions executable by one or more processors stored in one or more memory devices and/or storage devices, or any combination thereof. Although depicted outside of drive controller 210, in some embodiments, transaction logging module 130-a may include software, firmware, and/or hardware located within drive controller 210 and/or operated in conjunction with drive controller 210. For example, transaction logging module 130-a may include at least a portion of processor 230, buffer manager 235, and/or media controller 240. In one example, transaction logging module 130-a may include one or more instructions executed by processor 230, buffer manager 235, and/or media controller 240.

Figure 3:
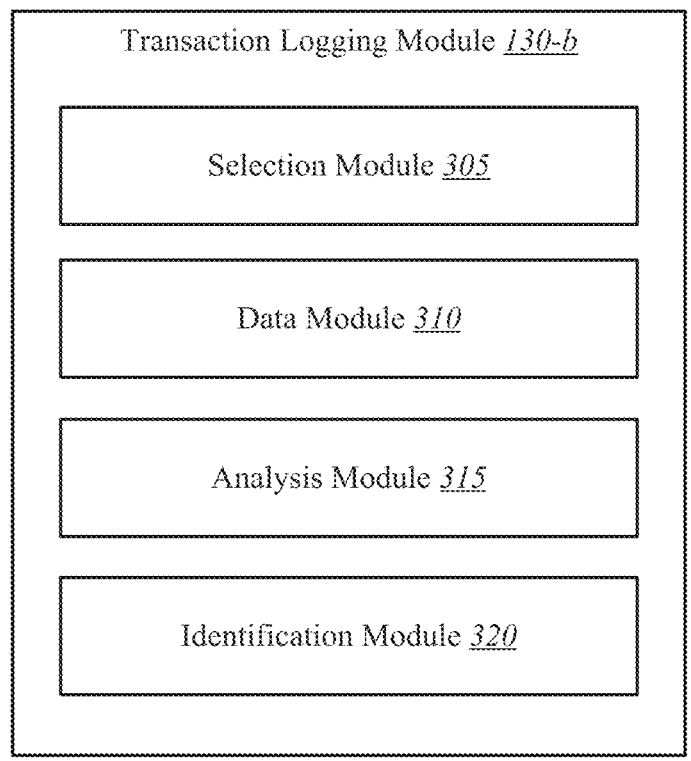
FIG. 3 shows a block diagram of one or more modules in accordance with various aspects of this disclosure.

FIG. 3 shows a block diagram of transaction logging module 130-b. The transaction logging module 130-b may include one or more processors, memory, and/or one or more storage devices. The transaction logging module 130-b may include selection module 305, data module 310, analysis module 315, and identification module 320. The transaction logging module 130-b may be one example of transaction logging module 130 of FIGS. 1 and/or 2. Each of these components may be in communication with each other.

In one embodiment, selection module 305 may be configured to select a portion of records from a transaction log. In one example, the transaction log may be associated with a file system of a storage system. Additionally or alternatively, the transaction log may be associated with a database of a storage system. In some cases, the transaction log may include a list of actions performed in relation to one or more files of a database and/or one or more directories of a file system associated with the storage system. In some cases, the transaction logging module 130 generates the transaction log and stores the generated transaction log in system memory and/or on a non-volatile storage device of the storage system. In some cases, the database of the storage system may include one or more non-volatile storage devices storing one or more files. In some cases, the one or more files stored in the database may be associated with the file system of the storage system.

In some cases, selection module 305 may be configured to monitor one or more aspects of the transaction log. In one embodiment, the number of records in the portion of records may be determined by one or more aspects of a memory queue. For example, aspects of a memory queue of the storage system may include at least one of a queue depth and a queue flush time, or both. For example, the memory queue may include a queue depth that indicates a maximum number of records that may be kept in the memory queue at any given time. As one example, the queue depth may be set to a maximum of 65,535 records. Additionally or alternatively, a queue depth may be set above or below this example queue depth. As another example, the queue flush time may be set to a predetermined amount of time such as 1 second. Alternatively, the flush time may be set to a value below or above 1 second such as 10 seconds or below one second such as 1 millisecond, etc. In some cases, the queue flush time automatically adjusts based at least in part on an overall observed load. For example, the selection module 305 may be configured to automatically increase the queue flush time upon determining the overall observed load of the storage system is increasing.

In some cases, the memory queue may take in, up to the queue depth, a number of most recent records available for analysis and may analyze those records during the queue flush time. Upon lapsing the queue flush time, the selection module 305 may flush the memory queue and select a new number of most recent records up to the queue depth. Thus, the number of records selection module 305 selects to be in the portion of records may be determined based at least in part on one or more aspects or configurations of the memory queue. In one embodiment, the memory queue may be stored in a memory device of the storage system such as random access memory or main memory of the storage system or a server of the storage system.

In one embodiment, the records of the transaction log may include information associated with one or more actions of a file system and/or a database of the storage system. For example, at least one record may include information regarding one or more system calls of a file system. Additionally or alternatively, at least one record may include information regarding one or more actions performed in relation to a database of the storage system. In some cases, the database may include a relational database. In some cases, the storage system may include a cloud storage system. Thus, in one example, the records of the transaction log may include information associated with one or more actions of a file system and/or a database of a cloud storage system. In some cases, those actions recorded in the records of the transaction log may be associated with actions performed in relation to one or more files stored in the database of the cloud storage system.

In some embodiments, data module 310 may be configured to assemble records in the portion of records into groups of related records. In one embodiment, actions are recorded in the transaction log in the order in which they occur. Thus, a first set of records associated with a first file may be randomly, intermittently, and/or sporadically spread out among all the records in the selected portion of records (e.g., the records presently in the memory queue). Likewise, a second set of records associated with a second file may be randomly, intermittently, and/or sporadically spread out among all the records in the selected portion of records, intermixed with or among the first set of records. In one embodiment, data module 310 may organize the randomly distributed records according to how those records relate to one another and/or how those records relate to one or more data objects such as one or more files stored in a database of a storage system. Examples of a data object associated with the storage system may include at least one file stored in a storage device of the storage system, at least one file stored in a database of the storage system, at least one file associated with the file system of the storage system, metadata associated with a file of the storage system, metadata associated with a file stored in the database, or at least one file system directory of the storage system, or any combination thereof.

In some embodiments, analysis module 315 may be configured to analyze one or more actions associated with particular records of the groups of related records. In one embodiment, data module 310 may be configured to remove one or more records from the portion of records based at least in part on the analysis. In one embodiment, at least one of the records of the transaction log may record an action performed in relation to one or more data objects associated with the storage system.

In one embodiment, data module 310 may be configured to build a database of the selected portion of records. In some cases, the database of the selected portion of records may include an in-memory database. In one example, the in-memory database may include a database contained within a memory device of the storage system such as random access memory, main memory, and/or cache memory of a cloud storage system or a server of the cloud storage system. In some cases, the memory queue may be stored at least in the in-memory database. Additionally or alternatively, the memory queue may be stored in a non-volatile storage device of the storage system. In some cases, the memory queue may be stored separately from the in-memory database.

In one example, data module 310 may build an in-memory database of the selected portion of records and the assembled groups of related records. In some embodiments, identification module 320 may be configured to identify each record associated with a first data object that is associated with the storage system. Additionally or alternatively, identification module 320 may be configured to identify each record associated with a second data object associated with the storage system.

As one example, data module 310 may be configured to group each record from the portion of records that is associated with a first data object into a first group of related records. Additionally or alternatively, data module 310 may be configured to group each record from the portion of records that is associated with a second data object into a second group of related records. In some cases, the records in the first group of related records may be arranged in the first group of related records in an order in which actions of the records associated with the first data object are performed. Additionally or alternatively, the records in the second group of related records may be arranged in the second group of related records in an order in which actions of the records associated with the second data object are performed.

In one example, analysis module 315 may analyze records in the first group of related records and/or analyze records in the second group of related records. In one embodiment, analysis module 315 may be configured to determine that results of the analysis indicate the first data object is no longer active or being acted upon by the storage system. For example, in some cases analysis module 315 may determine a database and/or file system associated with the first data object is no longer performing an action that affects the first data object or a status of the first data object. Similarly, analysis module 315 may determine that the database and/or file system is not expected or scheduled to perform an action that affects the first data object or that an action that affects the first data object is not pending. Additionally or alternatively, analysis module 315 may determine that the first data object is temporary or deleted (e.g., the first data object is a temporary file or a deleted file, etc.), and thus determine that the first data object is no longer active or being acted upon by the storage system. In some embodiments, data module 310 may be configured to remove at least the analyzed action that indicates the first data object is no longer active. Additionally or alternatively, in some cases data module 310 may remove the first group of related records from the transaction log upon determining the at least one action indicates the first data object is no longer being acted upon by the storage system.

In some embodiments, analysis module 315 may be configured to determine, based at least in part on the analysis of one or more actions, at least one action from the records associated with the second data object indicates the second data object remains active or remains in use by the storage system. In one example, analysis module 315 may determine a database and/or file system associated with the first data object is presently performing an action that affects the first data object or a status of the first data object. Additionally or alternatively, analysis module 315 may determine that the database and/or file system is scheduled to perform an action that affects the first data object, or that the database and/or file system is expected or more than likely to perform an action that affects the first data object, or any combination thereof.

In some embodiments, analysis module 315 may determine whether a particular data object is expected to remain active for a predetermined period of time. For example, the predetermined period of time may be set to any time (e.g., 10 seconds, etc.). Thus, in one example, analysis module 315 may determine whether the particular data object is expected to remain active for at least 10 seconds. For example, upon determining the second data object is expected to remain active for at least the predetermined period of time, analysis module 315 may determine that the second data object remains active. Otherwise, when analysis module 315 determines that the second data object is not expected to remain active beyond the predetermined period, analysis module 315 may determine that the second data object does not remain active. In some embodiments, data module 310 may be configured to consolidate two or more records in the second group of related records into a single consolidated record upon determining the at least one action indicates the second data object remains active or in use by the storage system.

Figure 4:
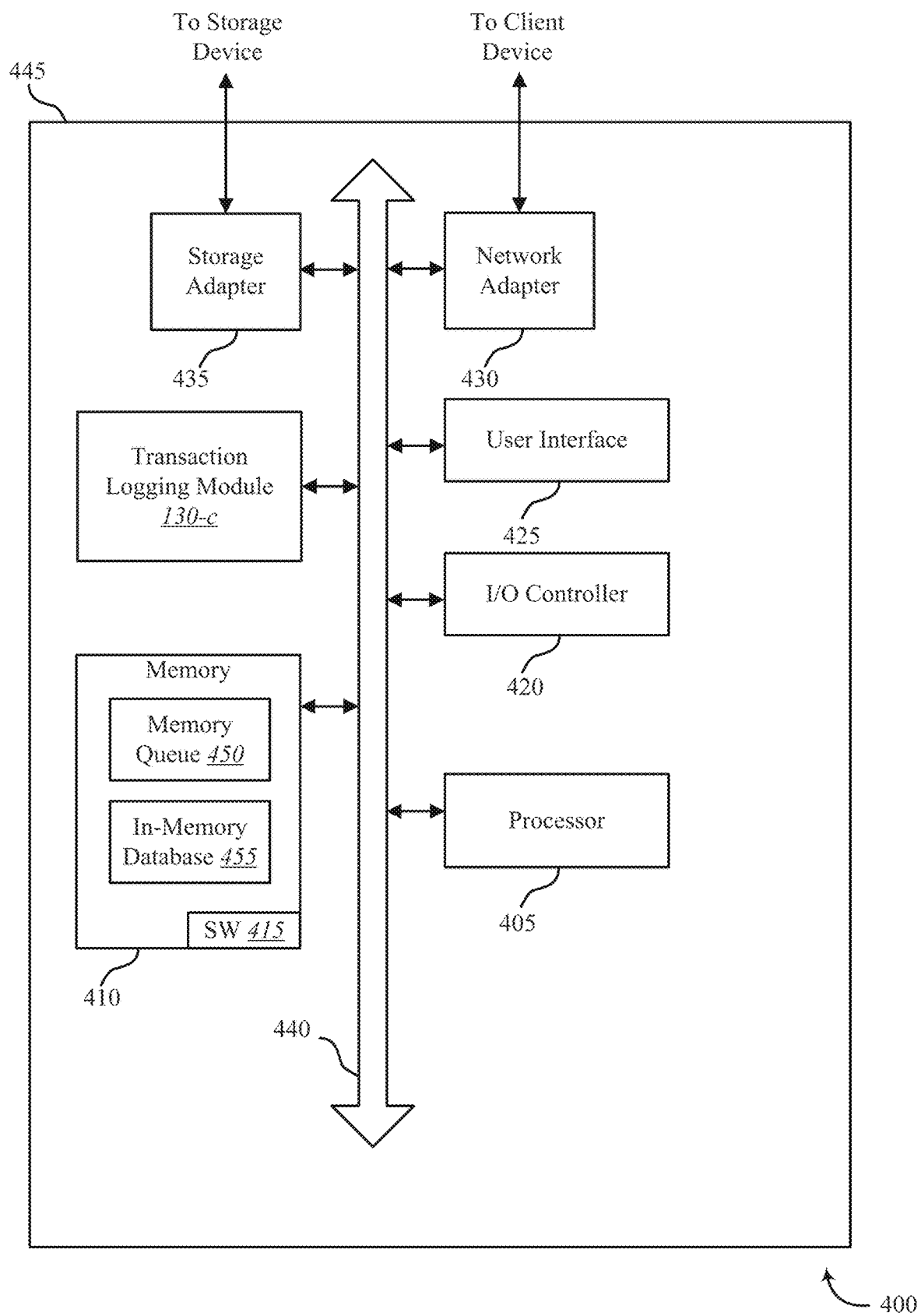
FIG. 4 shows a diagram of a system in accordance with various aspects of this disclosure.

FIG. 4 shows a system 400 for improving transaction log tracking, in accordance with various examples. System 400 may include an apparatus 445, which may be an example of any one of device 105 of FIG. 1 and/or device 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (apparatus 445 communicating directly with a storage system, for example) and/or indirect (apparatus 445 communicating indirectly with a client device through a server, for example).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. As depicted, memory 410 may include memory queue 450 and in-memory database 455. In some cases, transaction logger module 130-c may store one or more records of a transaction log inside memory queue 450. In some embodiments, transaction logger module 130-c may organize one or more records of the transaction log into groups of related records. In some cases, the groups of related records may be held in the in-memory database 455 to enable transaction logger module 130-c to analyze and/or process the records in the in-memory database 455 and/or the memory queue 450.

The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include transaction logging module 130-c, which may perform the functions described above for the transaction logging module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 445 such as processor module 405, memory 410, I/O controller module 420, user interface module 425, network adapter 430, and storage adapter 435, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (when compiled and executed, for example) to perform functions described herein. Alternatively, the computer-readable, computer-executable software/firmware code 415 may not be directly executable by the processor module 405, but may be configured to cause a computer, when compiled and executed, to perform functions described herein. The processor module 405 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the transaction logging module 130-c to implement the present systems and methods may be stored within the system memory 410. Applications resident with system 400 are generally stored on and accessed via a non-transitory computer readable medium, such as a hard disk drive or other storage medium.

Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 445 to access one or more data storage devices such as storage device 110. The one or more data storage devices may include two or more data tiers each. The storage adapter 445 may include one or more of an Ethernet adapter, a Fibre Channel adapter, Fibre Channel Protocol (FCP) adapter, a SCSI adapter, and iSCSI protocol adapter.

Figure 5:
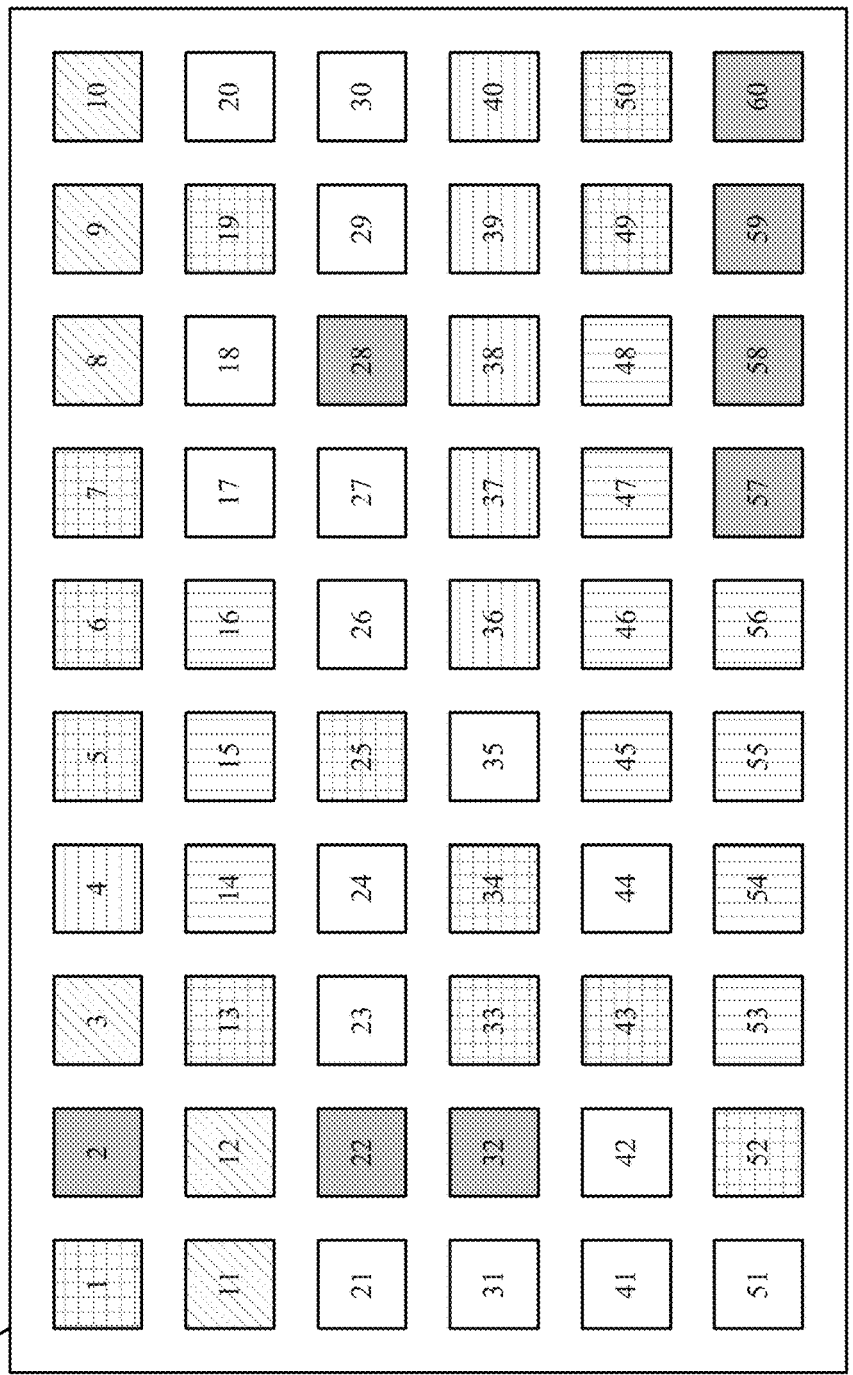
FIG. 5 shows one embodiment of an environment in accordance with various aspects of this disclosure.

FIG. 5 shows an environment 500 for improving transaction log tracking, in accordance with various examples. At least one aspect of environment 500 may be implemented in conjunction with device 105 of FIG. 1, apparatus 205 of FIG. 2, and/or transaction logging module 130 depicted in FIGS. 1, 2, 3, and/or 4.

As depicted, environment 500 includes a stream of records 505. As shown, the stream of records 505 may include record 1 through record 60. The stream of records 505 is depicted having 60 records as one example. Other examples may have less or more records. In one example, the stream of records 505 may include thousands of records, or more. In some embodiments, the stream of records 505 may be one example of a memory queue of the present systems and methods. In one embodiment, the stream of records 505 may include a queue depth and/or a queue flush time. For instance, the stream of records 505 include a queue depth that indicates a maximum number of records that may fit in the stream of records 505 at any given time. Additionally or alternatively, the queue flush time of the stream of records 505 may determine how long records are kept in the stream of records 505. For example, the queue flush time of the stream of records 505 may be set to a predetermined amount of time such as 1 second. After lapse of the queue flush time, the records shown in stream of records 505 may be flushed and a new set of records may be inputted into the stream of records 505. In one embodiment, the stream of records 505 may be stored in a memory queue within a volatile memory device such as main memory or system memory of the storage system. For example, the stream of records 505 may be stored in system memory of a storage server of a cloud storage system.

In some cases, records of a transaction log may arrive out of order in the relationship to each file or directory being acted upon. For example, as illustrated the stream of records 505 may represent multiple sets of records related to one or more files and/or directories. In one embodiment, each of the illustrated records 1-60 may include information regarding an action associated with a particular file and/or file system directory of the storage system. For illustrative purposes, each record depicted is represented with a certain pattern. For example, records 1, 5, 6, 7, 13, 19, 25, 33, 34, 43, 49, 50, and 52 include a cross-hatch pattern, while records 2, 22, 28, 32, 44, 57, 58, 59, and 60 have a solid grey pattern, and so forth. In some embodiments, each pattern is associated with a certain file or file system directory of a storage system. Thus, as one example, records 1, 5, 6, 7, 13, 19, 25, 33, 34, 43, 49, 50, and 52 may be associated with actions performed on or in relation to a first file and/or directory, while records 2, 22, 28, 32, 44, 57, 58, 59, and 60 may be associated with actions performed on or in relation to a second file and/or directory, etc.

In some embodiments, disordered record sets may result from the generation of one or more temporary files and/or temporary file system directories created by one or more end users of the storage system. Typically, temporary files exist in the storage system for a few seconds to a few minutes, and then are removed. Although some files and/or directories may be temporary, one or more operations may take place against the files and/or directories before the files and/or directories are purged from the storage system, resulting in excess load against both the file system and the relational database of the storage system. The following is one example of a string of actions in relation to a temporary file "temp.1":

1. Create file/mnt/lustre/user/temp.1
 2. Chmod file/mnt/lustre/user/temp.1
 3. Chown file/mnt/lustre/user/temp.1
 4. Truncate file/mnt/lustre/user/temp.1
 5. Close file/mnt/lustre/user/temp.1
 6. Append data to file/mnt/lustre/user/temp.1
 7. Truncate file/mnt/lustre/user/temp.1
 8. Append data to file/mnt/lustre/user/temp.1
 9. Truncate file/mnt/lustre/user/temp.1
 10. . . . .
 11. Remove file/mnt/lustre/user/temp.1

In one embodiment, the string of actions 1-11 listed may represent actions taken in relation to the temporary file "temp.1" as the actions occur. Thus, the first action "Create file" may occur first, followed by the second action "Chmod file" (a change mode action), followed by a third action "Chown file" (a change owner action), and so on. However, as illustrated in the stream of records 505, the indicated sequence may be spread out sporadically over the list of records. As depicted, after the ninth action, one or more actions may be performed, as represented by the ellipsis of action 10. Finally, at action 11, the file may be removed from the database. Based at least in part on the file being removed, one or more actions in the string of actions listed above may be removed from the transaction log.

In one embodiment, one or more database operations and/or file system operations may be associated with each action in the string of actions listed above. For example, the first action in the list, "Create file," may include database operations such as: select, insert, delete, update, etc. Additionally or alternatively, the first action in the list may include file system operations such as: stat, resolve file identifier (FID), resolve parent FID, getstripe, get extended attributes (EA) data, etc. In each processed record of the string of actions listed above, both expensive file system and database calls may be made, resulting in an average of four or more database operations (some relatively expensive computation wise) and at least five or more file system operations (again, some of which are relatively expensive computation wise). This database and file system churn occurs nearly every time the present systems and methods encounter a record set similar to that of FIG. 5.

Figure 6:
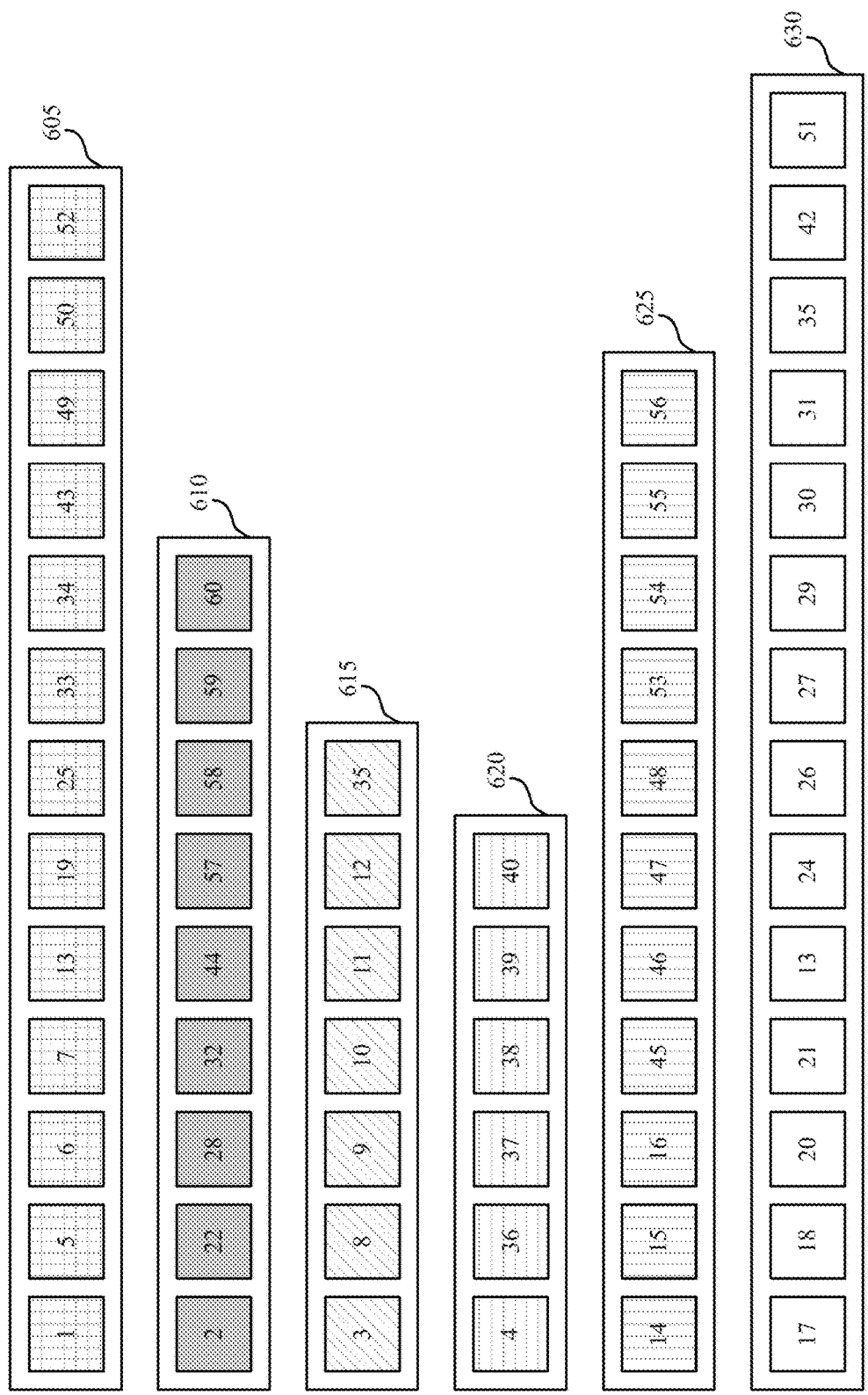
FIG. 6 shows another embodiment of an environment in accordance with various aspects of this disclosure.

FIG. 6 shows an environment 600 for improving transaction log tracking, in accordance with various examples. Environment 600 may be one example of environment 500 of FIG. 5. At least one aspect of environment 600 may be implemented in conjunction with device 105 of FIG. 1, apparatus 205 of FIG. 2, and/or transaction logging module 130 depicted in FIGS. 1, 2, 3, and/or 4.

As depicted, environment 600 includes a first group of related records 605, a second group of related records 610, a third group of related records 615, a fourth group of related records 620, a fifth group of related records 625, and a sixth group of related records 630. Environment 600 depicts six groups of related records as one example. Other examples may include less or more groups of records.

In one embodiment, the present systems and methods and transaction logging module 130 introduce intelligence into a processing workflow of storage system's transaction log. In some embodiments, the transaction logging module 130 generates an in-memory database and holds one or more records in the in-memory database to perform one or more operations on and/or in relation to the records held in the in-memory database. For example, transaction logging module 130 may store the stream of records 505 in an in-memory database and perform one or more operations on and/or in relation to the records of the stream of records 505 held in the in-memory database.

In one embodiment, the transaction logging module 130 may restructure the records in the stream of records 505 into a more orderly form, as shown in FIG. 6. In some embodiments, transaction logging module 130 may sort the records based on the relation each record has with a file and/or directory of the storage system. For example, transaction logging module 130 may determine that records 1, 5, 6, 7, 13, 19, 25, 33, 34, 43, 49, 50, and 52 are associated with a first file and/or directory, that records 2, 22, 28, 32, 44, 57, 58, 59, and 60 are associated with a second file and/or directory, that records 3, 8, 9, 10, 11, 12, and 35 are associated with a third file and/or directory, and so forth. Accordingly, transaction logging module 130 may group records 1, 5, 6, 7, 13, 19, 25, 33, 34, 43, 49, 50, and 52 into the first group of related records 605, group records 2, 22, 28, 32, 44, 57, 58, 59, and 60 into the second group of related records 610, group records 3, 8, 9, 10, 11, 12, and 35 into a third group of related records 615, and so forth.

In some embodiments, transaction logging module 130 may analyze each of the records after grouping the records into the respective groups of related records. Additionally or alternatively, transaction logging module 130 may analyze each of the records before and/or while grouping the records into the respective groups of related records. In some cases, transaction logging module 130 may determine which records to remove from the transaction log and/or from further processing based at least in part on the analysis. For instance, those records related to one or more temporary files may be selected for removal, as those records no longer affect database or file system operations. As one example, transaction logging module 130 may determine, based at least in part on the analysis, that one or more records or all of the records in the sixth group of related records 630 may be related to a temporary file. Accordingly, transaction logging module 130 may remove records 17, 18, 20, 21, 23, 24, 26, 27, 29, 30, 31, 35, 42, and 51 from the transaction log. Removing records from the transaction log that are associated with temporary files reduces the overall number of records processed and related database and file system operations, which translates to a measurable performance improvement to the storage system's processing of the transaction log. For example, real world testing showed that without the present systems and methods implemented the execution time in seconds was about 500 seconds for 5000 records, about 750 seconds for 10,000 records, about 1,250 seconds for 15,000 records, and about 1,625 seconds for 20,000 records. In contrast, with the present systems and methods implemented the execution time in seconds was about 50 seconds for 5000 records, about 100 seconds for 10,000 records, about 130 seconds for 15,000 records, and about 150 seconds for 20,000 records. Additionally, the present systems and methods reduce the overall file system and database load by the same factor.

Figure 7:
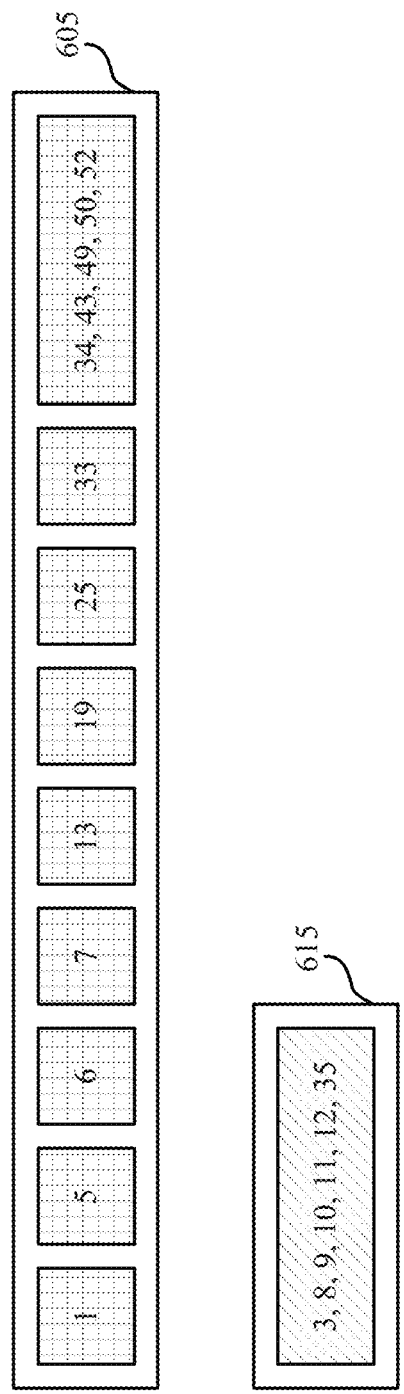
FIG. 7 shows another embodiment of an environment in accordance with various aspects of this disclosure.

FIG. 7 shows an environment 700 for improving transaction log tracking, in accordance with various examples. Environment 700 may be one example of environment 500 of FIG. 5 and/or environment 600 of FIG. 6. At least one aspect of environment 700 may be implemented in conjunction with device 105 of FIG. 1, apparatus 205 of FIG. 2, and/or transaction logging module 130 depicted in FIGS. 1, 2, 3, and/or 4.

As depicted, environment 700 includes the first group of related records 605 and the third group of records 615. Environment 700 depicts two groups of related records as one example. Other examples may include less or more groups of records.

In one embodiment, transaction logging module 130 may identify various types of database operations and/or file system operations that result in multiple records for a given file. For example, a single database operation and/or file system operation may result in multiple records being created and stored in the transaction log. In some embodiments, transaction logging module 130 may monitor for certain predetermined operations that result in multiple records for a given file and consolidate these records into a single database and/or file system set of records. As an example, transaction logging module 130 may determine that one or more records in the first group of related records 605 may be consolidated. When multiple records are consolidated into a single record within a group of related records, the overall database load may be reduced by performing only one commit operation for the multiple consolidated records, thereby aggregating changes into the most critical updates.

As one example, record 1 of the first group of related records 605 may be a create record, records 5, 6, 7, 13, 19, and 25 may be various change operations (chmod, chown, truncate, etc), while record 33 may be a rename operation. Based on the algorithms and analysis of the present systems and methods, transaction logging module 130 may collapse the additional operations, 34, 43, 49, 50 and 52 into a single transaction set or into a single record, thus reducing overall system load for future processing. In one embodiment, multiple database operation records may be consolidated into a single record of database operations and/or individual records of multiple file system calls may be consolidated into a single record of file system operations, thereby significantly reducing overall system load.

In one embodiment, all the records of a group of related records may be consolidated into a single record. For example, as illustrated, records 3, 8, 9, 10, 11, 12, and 35 of the third group of related records 615 may be consolidated into a single record. As one example, records 3, 8, 9, 10, 11, 12, and 35 may represent various types of updates such as chmod, chown, truncate, close, etc. Because all changes to the associated file occur within the in-memory block of records enqueued from the transaction log (e.g., all the associated records are contained within stream of records 505 depicted in FIG. 5), and transaction logging module 130 has successfully grouped these records into the third group of related records 615, transaction logging module 130 may combine seven different operational transactions into a single set of operations or a single record, which prevents the spawn of countless additional database and file system operations, thus improving efficiency and performance of the storage system. As shown, a set of operations may be collapsed into a single operational transaction set, resulting in a single update instead of sevens updates for this given example. Additionally, because transaction logging module 130 collapsed down the seven records into a single record, transaction logging module 130 is then able to leverage other performance tools within a relational database such as bulk inserts, bulk updates, and bulk deletes, all of which enable transaction logging module 130 to derive additional performance gains from an existing hardware profile of a storage system, thereby reducing the associated workload while enabling greater work capacity with the same hardware and software profiles.

Figure 8:
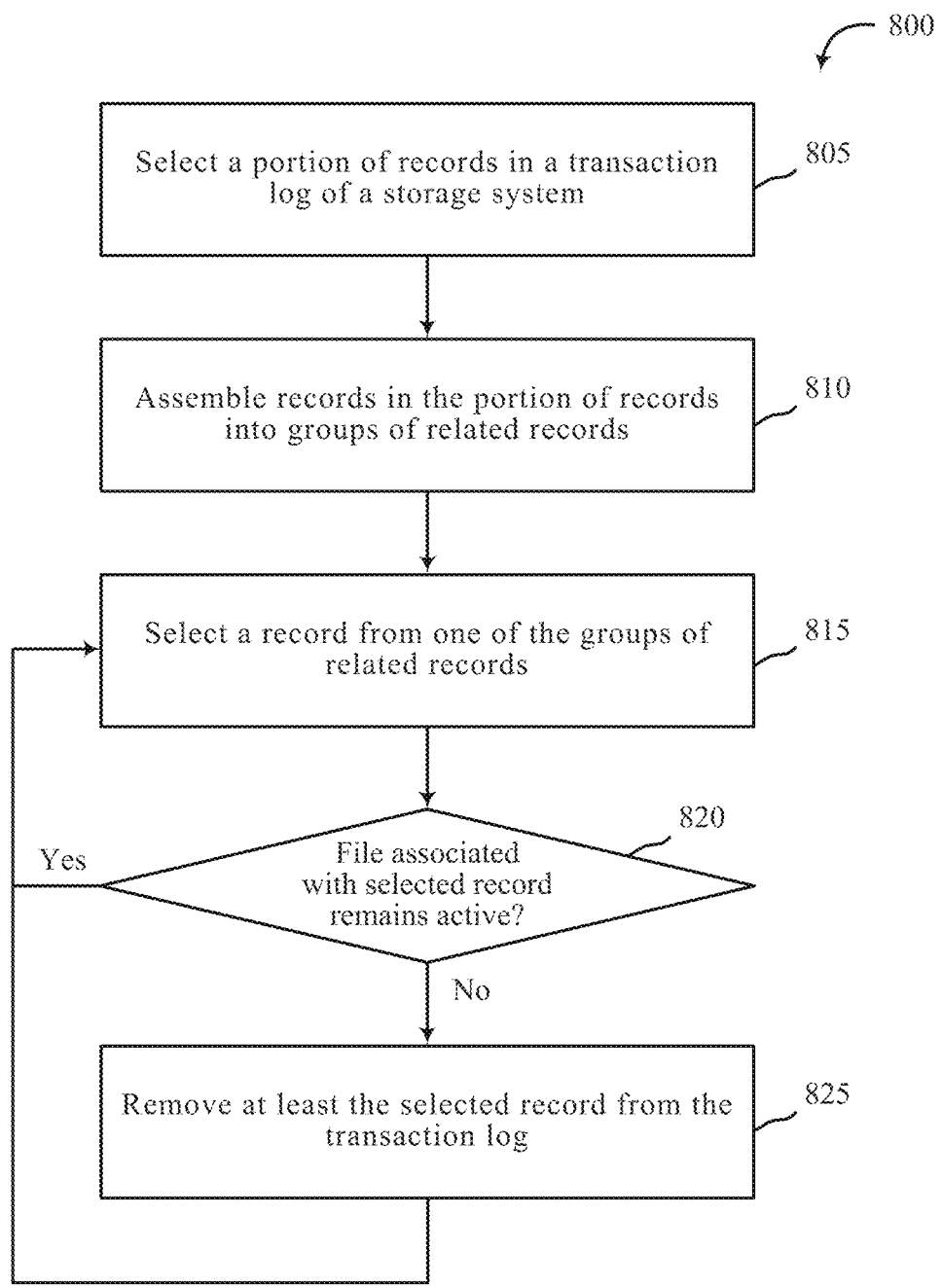
FIG. 8 is a flow chart illustrating an example of a method in accordance with various aspects of this disclosure.

FIG. 8 is a flow chart illustrating an example of a method 800 for improving transaction log tracking, in accordance with various aspects of the present disclosure. One or more aspects of the method 800 may be implemented in conjunction with device 105 of FIG. 1, apparatus 205 of FIG. 2, and/or transaction logging module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 805, method 800 may be configured to select a portion of records in a transaction log of a storage system. In some cases, at least one of the records of the transaction log records an action performed in relation to one or more data objects associated with the storage system. At block 810, method 800 may be configured to assemble records in the portion of records into groups of related records.

In some cases, method 800 may analyze one or more actions associated with particular records of the groups of related records. For example, at block 815 method 800 may be configured to select at least one record from a group of related records. Method 800 may then analyze one or more aspects of the at least one selected record.

At block 820, method 800 may be configured to determine whether a file associated with the selected record remains active. For example, when method 800 determines a database and/or file system associated with the file is presently performing an action that affects the file, is scheduled to perform an action that affects the file, is expected or more than likely to perform an action that affects the file, or any combination thereof, method 800 may determine that the file remains active.

Upon determining the file associated with the selected record does remains active, method 800 may return to block 815 to select a different record or one or more different records for analysis. In some cases, method 800 may select one or more different records from the same group of related records. Additionally or alternatively, method 800 may select one or more different records from a different group of related records.

At block 825, method 800 may be configured to remove one or more records from the transaction log. For example, at block 825, method 800 may be configured to remove at least the selected record upon determining a file associated with a selected and analyzed record is no longer active. In some cases, method 800 may remove the selected record and/or one or more other records from the group of related records in which the current record is located upon determining the file associated with the selected record does not remain active. Additionally or alternatively, method 800 may remove from the transaction log the entire group of related records in which the current record is located and all records within that group upon determining the file associated with the selected record is no longer active. In some cases, upon removing one or more records from the transaction log, method 800 may return to block 815 to select at least one different record for analysis.

The operation(s) at block 805-825 may be performed using the transaction logging module 130 described with reference to FIGS. 1-4 and/or another module. Thus, the method 800 may provide for improving transaction log tracking. It should be noted that the method 800 is just one implementation and that the operations of the method 800 may be rearranged, omitted, and/or otherwise modified such that other implementations are possible and contemplated.

Figure 9:
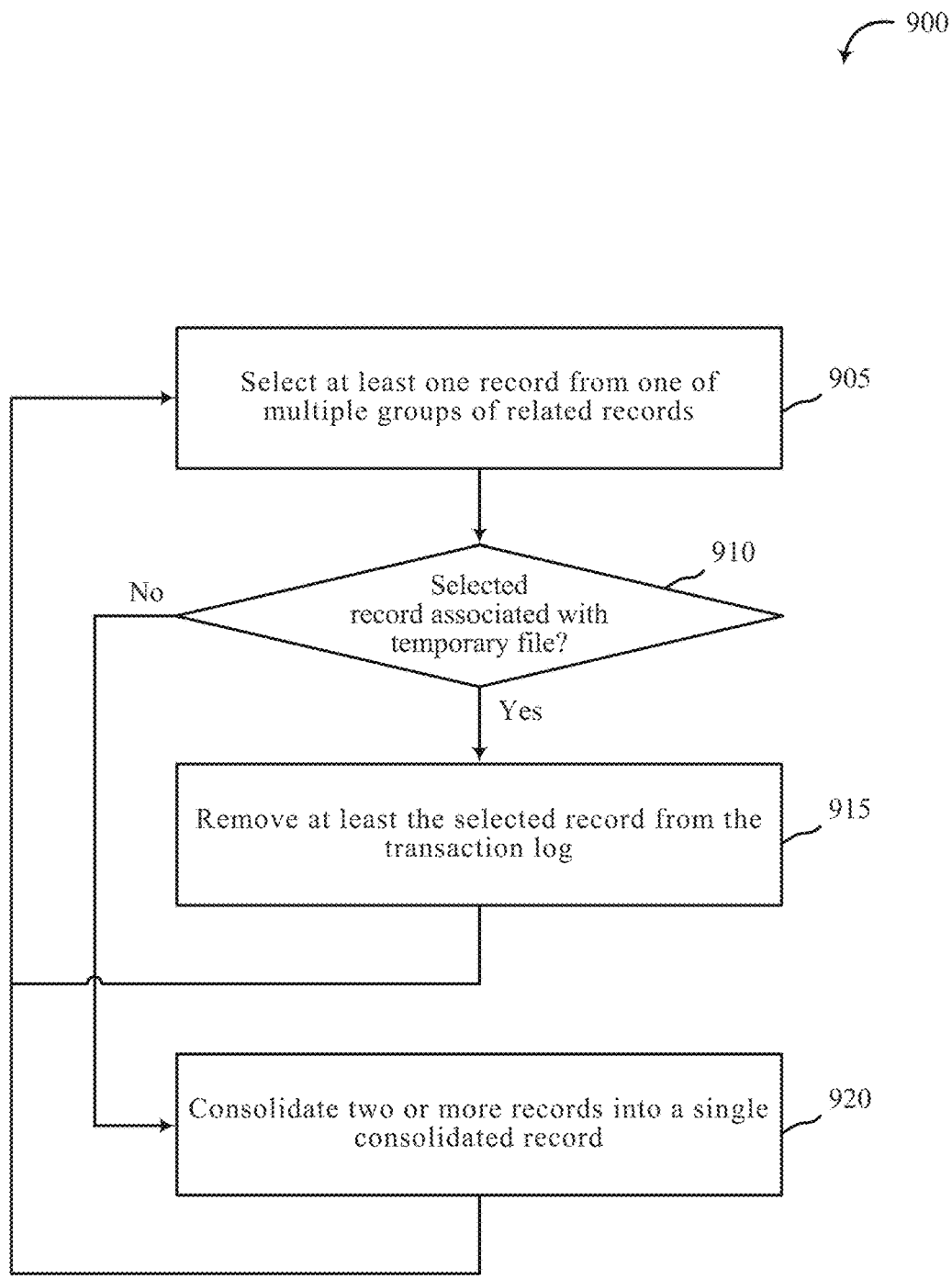
FIG. 9 is a flow chart illustrating an example of a method in accordance with various aspects of this disclosure.

FIG. 9 is a flow chart illustrating an example of a method 900 for improving transaction log tracking, in accordance with various aspects of the present disclosure. One or more aspects of the method 900 may be implemented in conjunction with device 105 of FIG. 1, apparatus 205 of FIG. 2, and/or transaction logging module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

In some cases, method 900 may analyze one or more actions associated with one or more records in a group of related records. For example, at block 905 method 900 may be configured to select at least one record from the selected group of related records. In some cases, method 900 may select one or more records from the same group of related records. Alternatively, method 800 may select for analysis one or more records from a first group of related records and one or more records of a second group of related records. Method 900 may then analyze one or more aspects of the at least one selected record.

At block 910, method 900 may be configured to determine whether a file associated with the selected record is a temporary file. Upon determining the file associated with the selected record is not a temporary file, method 900 may proceed to block 920. At block 920, method 800 may be configured to consolidate two or more records into a single consolidated record. For example, method 900 may consolidate at least two records from the same group of related records into a single consolidated record, replacing the at least two records in the group of related records with a single record that includes the information from each of the consolidated records. In some cases, the at least two records may include the at least one selected record. In some embodiments, upon consolidating the at least two records, method 900 may return to block 905 to select at least one different record for analysis.

Upon determining the file associated with the selected record is a temporary file, method 900 may proceed to block 915. At block 915, method 900 may be configured to remove at least the selected record upon determining the file associated with the selected record is a temporary file. In some cases, upon removing one or more records from the transaction log, method 900 may return to block 905 to select one or more different records for analysis.

The operations at blocks 905-920 may be performed using the transaction logging module 130 described with reference to FIGS. 1-4 and/or another module. Thus, the method 900 may provide for improving transaction log tracking. It should be noted that the method 900 is just one implementation and that the operations of the method 900 may be rearranged, omitted, and/or otherwise modified such that other implementations are possible and contemplated.

In some examples, aspects from two or more of the methods 800 and 900 may be combined and/or separated. It should be noted that the methods 800 and 900 are just example implementations, and that the operations of the methods 800 and 900 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
a storage drive; and
a processor configured to select a portion of records in a transaction log, assemble records in the portion of records into groups of related records, analyze one or more actions associated with particular records of the groups of related records, and remove one or more records from the portion of records based at least in part on the analysis, and build an in-memory database of the portion of records selected and assembled from the records of the transaction log, wherein a size of the in-memory database is determined by at least one of a predetermined record depth and a predetermined queue flush time.

2. The storage system of claim 1, wherein at least one of the records of the transaction log recording an action performed in relation to one or more data objects associated with the storage system.

3. The storage system of claim 1, wherein the processor is further configured to:
identify each record associated with a first data object associated with the storage system; and
identify each record associated with a second data object associated with the storage system.

4. The storage system of claim 3, wherein the processor is further configured to:
group each record from the portion of records that is associated with the first data object into a first group of related records; and
group each record from the portion of records that is associated with the second data object into a second group of related records.

5. The storage system of claim 4, wherein the records in the first group of related records are arranged in an order in which actions of the records in the first group of related records are performed, and wherein the records in the second group of related records are arranged in an order in which actions of the records in the second group of related records are performed.

6. The storage system of claim 3, wherein the processor is further configured to:
determine, based at least in part on the analysis, at least one action from the records associated with the first data object indicates the first data object is no longer being acted upon by the storage system.

7. The storage system of claim 6, wherein the processor is further configured to:
remove the first group of related records from the transaction log upon determining the at least one action indicates the first data object is no longer being acted upon by the storage system.

8. The storage system of claim 3, wherein the processor is further configured to:
determine, based at least in part on the analysis, at least one action from the records associated with the second data object indicates the second data object remains in use by the storage system.

9. The storage system of claim 8, wherein the processor is further configured to:
consolidate two or more records in the second group of related records into a single consolidated record upon determining the at least one action indicates the second data object remains in use by the storage system.

10. The storage system of claim 1, wherein the one or more data objects include at least one file stored in a database of the storage system or at least one directory of a file system of the storage system, or any combination thereof.

11. A method to improve a storage system comprising:
selecting a portion of records in a transaction log;
assembling records in the portion of records into groups of related records;
analyzing one or more actions associated with particular records of the groups of related records;
removing one or more records from the portion of records based at least in part on the analysis; and
building an in-memory database of the portion of records selected and assembled from the records of the transaction log, wherein a size of the in-memory database is determined by at least one of a predetermined record depth and a predetermined queue flush time.

12. The method of claim 11, wherein at least one of the records of the transaction log recording an action performed in relation to one or more data objects associated with the storage system.

13. The method of claim 11, comprising:
identifying each record associated with a first data object associated with the storage system; and
identifying each record associated with a second data object associated with the storage system.

14. The method of claim 13, comprising:
grouping each record from the portion of records that is associated with a first data object into a first group of related records; and
grouping each record from the portion of records that is associated with a second data object into a second group of related records.

15. The method of claim 14, wherein the records in the first group of related records are arranged in an order in which actions of the records in the first group of related records are performed, and wherein the records in the second group of related records are arranged in an order in which actions of the records in the second group of related records are performed.

16. The method of claim 13, comprising:
determining, based at least in part on the analysis, at least one action from the records associated with the first data object indicates the first data object is no longer being acted upon by the storage system.

17. The method of claim 16, comprising:
removing the first group of related records from the transaction log upon determining the at least one action indicates the first data object is no longer being acted upon by the storage system.

18. The method of claim 13, comprising:
determining, based at least in part on the analysis, at least one action from the records associated with the second data object indicates the second data object remains in use by the storage system; and
consolidating two or more records in the second group of related records into a single consolidated record upon determining the at least one action indicates the second data object remains in use by the storage system.

19. A computer-program product to improve a cloud storage system comprising:
the computer-program product comprising a non-transitory computer-readable medium storing instructions thereon, the instructions being executable by one or more processor to perform the steps of:
monitoring records of a transaction log, at least one of the records of the transaction log recording an action performed in relation to one or more data objects associated with the cloud storage system, the one or more data objects including at least one file stored in a database of the cloud storage system or at least one directory of a file system of the cloud storage system, or any combination thereof;
selecting a portion of records in the transaction log;
assembling records in the portion of records into groups of related records;
analyzing one or more actions associated with particular records of the groups of related records;
removing one or more records from the portion of records based at least in part on the analysis; and
building an in-memory database of the portion of records selected and assembled from the records of the transaction log, wherein a size of the in-memory database is determined by at least one of a predetermined record depth and a predetermined queue flush time.

20. The computer-program product of claim 19, wherein the queue flush time automatically adjusts based at least in part on an overall observed load.

* * * * *